United States Patent
Gray, Jr.

[11] Patent Number: 5,275,194
[45] Date of Patent: Jan. 4, 1994

[54] FIRE CONTROL VALVE WITH REPLACEABLE LOCKING PIN ASSEMBLY

[75] Inventor: Charles H. Gray, Jr., Kingsport, Tenn.

[73] Assignee: Donald E. Oates, Deer Park, Tex.

[21] Appl. No.: 983,136

[22] Filed: Nov. 30, 1992

[51] Int. Cl.⁵ .................................................. F16K 17/40
[52] U.S. Cl. ........................................ 137/75; 251/297; 251/324; 251/900
[58] Field of Search .................. 137/72, 75; 251/297, 251/322, 323, 324, 900

[56] References Cited

U.S. PATENT DOCUMENTS

| | | | |
|---|---|---|---|
| 325,989 | 9/1885 | Stearns | 137/75 |
| 422,583 | 3/1890 | Finch et al. | 137/75 |
| 997,147 | 7/1911 | McDonald et al. | 137/75 |
| 1,017,385 | 2/1912 | Davis | 251/291 |
| 1,892,921 | 1/1933 | White | 137/75 |
| 1,927,246 | 9/1933 | Schulte | 137/75 |
| 2,299,859 | 10/1942 | Anagno | 251/339 |
| 2,630,818 | 3/1953 | McRae | 137/75 |
| 2,638,106 | 5/1953 | Shiels | 137/75 |
| 2,721,571 | 10/1955 | Gershon | 137/75 |
| 3,221,932 | 12/1965 | Anderson | 251/324 |
| 3,473,544 | 10/1969 | Nielsen, Jr. | 137/75 |
| 3,720,220 | 3/1973 | McMath | 137/75 |
| 3,835,875 | 9/1974 | Morse | 137/75 |
| 4,245,662 | 1/1981 | McGee | 137/75 |
| 4,890,635 | 1/1990 | Gray, Jr. | 137/75 |
| 5,004,003 | 4/1991 | Gray, Jr. | 137/75 |

Primary Examiner—George L. Walton
Attorney, Agent, or Firm—Malcolm G. Dunn

[57] ABSTRACT

Fire control valve through which flows flammable material, such as gas or liquid, includes exteriorly located, replaceable locking pin assembly having a locking pin for locking the valve member of the fire control valve in the open position to enable flow through the fire control valve, the locking pin assembly being also located out of the path of such flow and including a heat-meltable material that holds locking pin in locked position with the valve member and, upon being melted, enables release of locking pin from locked position; the fire control valve including a sealing arrangement to prevent escape of flammable material to atmosphere past valve member and locking pin assembly.

15 Claims, 2 Drawing Sheets

FIRE CONTROL VALVE WITH REPLACEABLE LOCKING PIN ASSEMBLY

BACKGROUND OF THE INVENTION

1. Technical Field

The present invention generally relates to a fire control valve and more particularly to a valve installed in a flow line for a flammable fluid or gas and which is in a normally open position to allow flow of the fluid or gas but will be automatically closed to interrupt such flow in the event of a hazardous condition, such as a fire or undue increased heat.

2. Background Information

Fire control valves, which allow flow of fluid or gas, but will be automatically closed to interrupt such flow in the event of fire or undue increased heat, are known in the prior art. Such prior art includes U.S. Pat. Nos. 4,890,635 (1990) and 5,004,003 (1991), both of which have issued in my name; and U.S. Pat. Nos. 422,583 (1890), 2,638,106 (1953), 3,473,544 (1959), 3,720,220 (1973), and 3,835,875 (1974).

Each of the patents indicated above discloses the use of a low melting metal alloy or fusible material, which when subjected to undue heat, melts and enables the triggering of mechanism connected to the fusible or low melting material to interrupt the flow of flammable fluid or gas. In some instances, the low melting material is in the form of a mechanical link, such as shown at 64 in FIG. 3 of my U S. Pat. No. 4,890,635, and at 74 in FIG. 3 of my U.S. Pat. No. 5,004,003. In U.S. Pat. No. 2,638,106, a fusible link is shown at 35 in FIG. 1 (the rupture of such link and the consequent closing of a valve being shown in FIG. 2).

My invention provides a fire control valve, which has a readily replaceable locking pin assembly for locking a movable valve member in the fire control valve in an open position to enable flow of flammable material through the fire control valve. The locking pin assembly includes as part of the assembly a heat-meltable material. When the heat-meltable material is caused by fire or undue increased heat to melt, the locking pin of the locking pin assembly is caused to retract from the valve member and allow the valve member to close, thereby interrupting the flow of flammable material through the fire control valve.

When the conditions causing the fire or undue increased heat have been corrected, it then becomes necessary to reset the fire control valve so that the flow of flammable material through the fire control valve can be resumed. The locking pin assembly is removed from the fire control valve,,and another one, which has already been prepared to include heat-meltable material, is readily installed in place of the other without undue delay, and then the valve member is locked in the open position again.

The Nielsen, Jr. patent, U.S. Pat. No. 3,473,544 (1969), discloses a plug 19, which contains a metallic alloy that will melt at a low temperature, and appears to be replaceable, but does not contain a locking pin that makes direct locking engagement with a valve member as I disclose. This is also true in the Morse patent, U.S. Pat. No. 3,835,875 (1974), which discloses a plug 20 that also contains a heat-meltable metallic alloy.

The Shiels patent, U.S. Pat. No. 2,638,106 (1953), discloses a locking pin for making direct locking engagement with a valve member, but the fuse element 35 is not part of the locking pin. Also, the valve housing must be partially dismantled before the fuse element can be replaced and the valve member reset in the open position. Shiels further discloses a diaphragm 27, which is used to seal off one end of the opening in which the locking pin is located, as well as levers 25 and 32, all of which must intervene between the fuse element 35 and the locking pin or plunger 10.

The McMath patent, U.S. Pat. No. 3,720,220 (1973), discloses a fusible plug assembly 40. When the fusible plug members 44, 46 are caused to melt, the retraction of the pin 48 in the fusible plug assembly is controlled by the movement of the valve or ball 32 against the pin 48 and the flow pressure of the liquid against the ball 32. The retraction of the locking pin in my invention is controlled solely by the locking pin assembly, once the fusible material in the locking pin assembly is caused to melt. It would also appear that the retraction movement of the pin 48 in McMath would not be as readily responsive as is the retraction movement in my invention because the patentee discloses the use of a seal 50 that necessarily must fit tightly around the pin 48 so as to prevent leakage into the fusible plug assembly of the liquid paint flowing through the valve. This tight fit would appear to cause undue friction on the pin and thereby serve to retard its retraction movement. Still a further difference in my invention over the McMath structure is that I locate the locking pin assembly on the fire control valve out of the path of flow of the flammable material and then seal off the locking pin assembly from any escape therepast of the flammable material to atmosphere.

It should be noted that in the Shiels patent mentioned above, the locking pin is also located within the flow path of the flammable material. This is also true in the Nielsen, Jr. and Morse patented structures discussed above.

The Finch et al patent, U.S. Pat. No. 422,583 (1890), discloses a locking pin G and a fusible nut I, but the fusible nut I is not interconnected with the locking pin G. Therefore, the locking pin G must be retracted from its locking with the valve-stem D after the fusible nut has been installed or else the valve-stem will not close when the fusible nut is caused to melt.

DISCLOSURE OF THE INVENTION

In accordance with the present invention, I provide a fire control valve having a valve body defining a flow passage therethrough and adapted to be connected to a flow line through which flammable material flows. The valve body includes a valve seat, and a valve member movably engageable into a seated position with the valve seat and forming a closure for the flow passage when engaged with the valve seat and defining within its side surface an abutment. The valve body also includes a first spring arrangement biasing the valve member into engagement with the valve seat, and a locking pin assembly for releasably retaining the valve member in a retracted position from the valve seat to enable flow of the flammable material through the flow passage. The locking pin assembly comprises (a) a locking pin movably mounted for engagement with the abutment on the valve member when the valve member is in the retracted position, (b) a temperature-responsive arrangement including heat-meltable material in the form of an unmelted plug engaging against the opposite end of the locking pin and retaining the locking pin in engagement with the abutment on the valve member, and (c) a second spring means biasing the locking pin away from engagement with the abutment on the valve member.

The valve body in the fire control valve also defines (a) a first cylindrical chamber extending along a part of the length of the valve body and in which the valve member is movable, (b) an end wall at the opposite end of the first cylindrical chamber from the valve seat, and (c) an inlet to the flow passage through which the flammable material enters into the valve body and an outlet to the flow passage through which the flammable material exits from the valve body.

The valve member is generally cylindrical and is sized for a sliding fit with the walls of the first cylindrical chamber and has a sealing arrangement extending around the valve member and between the valve member and the walls of the first cylindrical chamber. The valve body defines an opening through a side wall of the valve body into the first cylindrical chamber, and the locking pin assembly extends into the side wall opening at a location between the sealing arrangement on the valve member and the end wall of the first cylindrical chamber.

The end wall of the first cylindrical chamber defines an opening in the valve body, and the valve member has an outer end portion that extends through the end wall opening beyond the valve body when the valve member is in the retracted position from the valve seat.

The valve member has at one end a flange facing opposite the end wall of the first cylindrical chamber and has at the other end an end surface conformed to engage against the valve seat when in seated position. The first spring arrangement in the valve body of the fire control valve extends around the valve member adjacent the flange of the valve member and in compression between the flange and the end wall of the first cylindrical chamber. The sealing arrangement for the valve member includes first and second seals spaced from each other along the length of the valve member and between the valve member and the walls of the first cylindrical chamber.

The valve member defines adjacent one end thereof opposite the valve seat an annular groove extending around and within a side surface of the valve member to form the abutment for the locking pin of the locking pin assembly.

The locking pin assembly includes a housing having an inner end extending at an angle into and through the side wall of the fire control valve. The housing defines therewithin a second cylindrical chamber extending the length of the housing, and the locking pin is movably mounted within the second cylindrical chamber. The inner end of the second cylindrical chamber defines an annular seat. The locking pin defines along a part of its length a coaxial circular abutment having a greater diameter than the general diameter of the locking pin, and the second spring means for the locking pin assembly extends around one end of the locking pin and in compression between the annular seat for the second cylindrical chamber and the coaxial circular abutment.

The outer end of the housing for the locking pin assembly defines at least one escape port through the wall of the housing, and the heat-meltable material fills this escape port and extends into the second cylindrical chamber to form an unmelted plug engaging against the opposite end of the locking pin and retains the locking pin in engagement with the abutment on the side surface of the valve member.

The outer end of the housing of the locking pin assembly may also define at least two escape ports through the wall of the housing and which are located diametrically opposite each other. The heat-meltable material fills the at least two escape ports and extends into the second cylindrical chamber to form an unmelted plug engaging the opposite end of the locking pin and retaining the locking pin in engagement with the abutment on the side surface of the valve member.

The outer end of the housing of the locking pin assembly preferably defines at least three escape ports through the wall of the housing. Two of the escape ports are located diametrically opposite each other and the third escape port is located axially opposite the outer end of the locking pin. The heat-meltable material fills the three escape ports and extends into the second cylindrical chamber to form an unmelted plug engaging the opposite end of the locking pin and retaining the locking pin in engagement with the abutment on the side surface of the valve member.

The housing for the locking pin assembly comprises a cylindrical retainer sleeve and a cylindrical sensor body. The cylindrical sensor body has a greater diameter than the cylindrical retainer sleeve. The cylindrical retainer sleeve is externally threaded along its length for threaded engagement of its inner end portion into and through the side wall of the valve body and also for threaded engagement of its outer end portion into the cylindrical sensor body. The cylindrical sensor body is internally threaded along an inner portion of its length for receiving in threaded engagement the outer end portion of the cylindrical retainer sleeve.

The cylindrical sensor body of the housing for the locking pin assembly defines at least one escape port through the wall of the cylindrical sensor body and the heat-meltable material fills the at least one escape port and extends into the second cylindrical chamber to form an unmelted plug engaging against the opposite end of the locking pin and retaining the locking pin in engagement with the abutment on the side surface of the valve member.

The cylindrical sensor body of the housing for the locking pin assembly may define at least two escape ports through the wall of the cylindrical sensor body. The two escape ports are located diametrically opposite each other. The heat-meltable material fills the at least two escape ports and extends into the second cylindrical chamber to form an unmelted plug engaging against the opposite end of the locking pin and retaining the locking pin in engagement with the abutment on the side surface of the valve member.

The cylindrical sensor body of the housing for the locking pin assembly preferably defines at least three escape ports through the wall of the sensor body. Two of the escape ports are located diametrically opposite each other and the third escape port is located axially opposite the outer end of the locking pin. The heat-meltable material fills the three escape ports and extends into the second cylindrical chamber to form an unmelted plug engaging the opposite end of the locking pin and retaining the locking pin in engagement with the abutment on the side surface of the valve member.

The abutment within the side surface of the valve member comprises a groove extending within the side surface of and around the valve member.

The housing for the locking pin assembly includes a cylindrical retainer sleeve, which defines a smooth interior wall surface for the second cylindrical chamber, and the outer surface of the coaxial circular abutment of the locking pin slidingly engages with the smooth interior wall surface in the cylindrical retainer sleeve and guides the locking pin for sliding movement within the second cylindrical chamber.

The locking pin for the locking pin assembly defines at one end a rounded end portion for engagement with the abutment on the side surface of the valve member and at its opposite end a flat end surface, which has a smaller diameter than the interior wall surface of the second cylindrical chamber, for engagement against the unmelted plug.

The opposite end of the locking pin for the locking pin assembly has a smaller diameter than the third escape port for enabling the opposite end of the locking pin to slidingly fit within the third escape port when the plug of meltable material melts.

One end of the locking pin assembly is threadedly seated within the opening through the side wall of the valve body.

BRIEF DESCRIPTION OF THE DRAWING

The details of my invention will be described in connection with the accompanying drawing, in which.

DESCRIPTION OF THE PREFERRED EMBODIMENT

Figure 1:
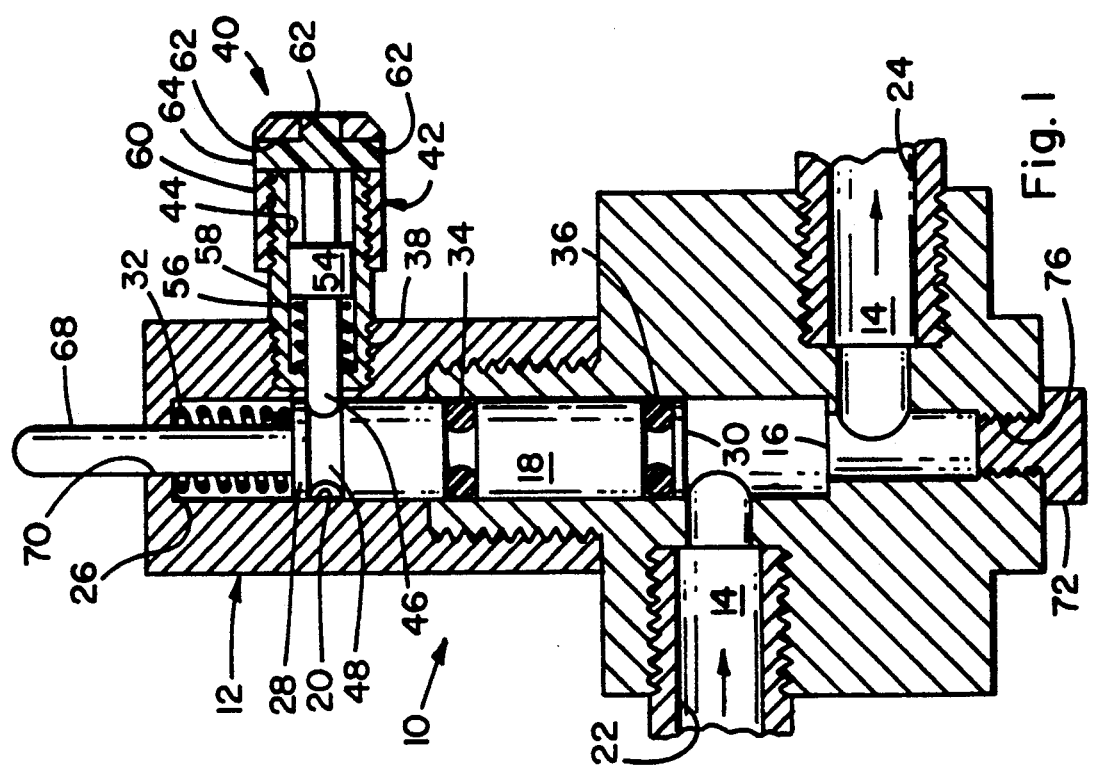
FIG. 1 is a side elevational view in cross-section of the fire control valve and the installed locking pin assembly, showing the locking pin locking the valve member of the fire control valve in the open position.

In reference to the drawings, and initially to FIG. 1, the fire control valve is shown in general at 10 and it includes a valve body 12, which defines a flow passage 14 through the valve body and which is adapted to be connected to a flow line (not shown) through which flows flammable material, such as a gas or liquid. The valve body 12 includes a valve seat 16, and a valve member 18, which within the valve body is movably engageable into a seated position with the valve seat, thereby forming a closure for the flow passage 14 when engaged with the valve seat.

The valve body 12 defines a first cylindrical chamber 20, which extends along a part of the length of the valve body and in which the valve member 18 is movable. The valve member also defines an inlet 22 to the flow passage 14 through which the flammable material enters into the valve body and an outlet 24 through which the flammable material exits from the valve body. The first cylindrical chamber 20 has an end wall 26 at the opposite end of the first cylindrical chamber from the valve seat 16.

The valve member 18 is generally cylindrical and is sized so as to have a sliding fit with the walls of the first cylindrical chamber. The valve member has at one end a flange 28, which faces opposite the end wall 26 of the first cylindrical chamber, and at the other end an end surface 30, which is conformed to engage against the valve seat when the valve member is in seated position. A first spring arrangement 32 extends around the valve member adjacent the flange 28 on the valve member 18 and is in compression between the flange and the end wall 26 of the first cylindrical chamber for biasing the valve member into engagement with the valve seat 16.

The valve member 18 is provided with a double sealing arrangement extending around the valve member and between the valve member and the walls of the first cylindrical chamber 20 to prevent leakage therepast of the flammable material. The double sealing arrangement includes a first O-ring seal 34 and a second O-ring seal 36, each engaged and seated within an outer groove formed within the surface of the valve member and being spaced along the length of the valve member from each other. When the valve member is in the open position, as shown in FIG. 1, the double seal arrangement prevents any flow from the flow passage of the flammable material past the seal arrangement to atmosphere.

The valve body 12 further defines an opening 38 through a side wall of the valve body into the first cylindrical chamber 20. A locking pin assembly, which is indicated in general at 40, is removably connected to the fire control valve 10 through the opening 38 in the valve body, such removable connection being shown as a threaded engagement of the locking pin assembly with the opening 38 in the valve body. The details of the threaded construction will be described later. The locking pin assembly, as shown in FIG. 1, serves to releasably retain the valve member 18 in a retracted position from the valve seat 16 to enable flow of the flammable material through the flow passage 14 of the fire control valve 10.

The locking pin assembly 40 includes a housing 42 having an inner end extending at an angle into and through the opening 38 of the valve body 12. The housing 42 defines therewithin a second cylindrical chamber 44, which extends the length of the housing and in which a locking pin 46 is movably mounted for locking engagement with the valve member 18 in the valve body of the fire control valve. The valve member defines an abutment 48, which comprises an annular groove extending around and within a side surface of the valve member. The formation of an annular groove for the abutment in the valve member eliminates the necessity of rotatably orienting the valve member so as to align the abutment relative to the locking pin.

Figure 3:
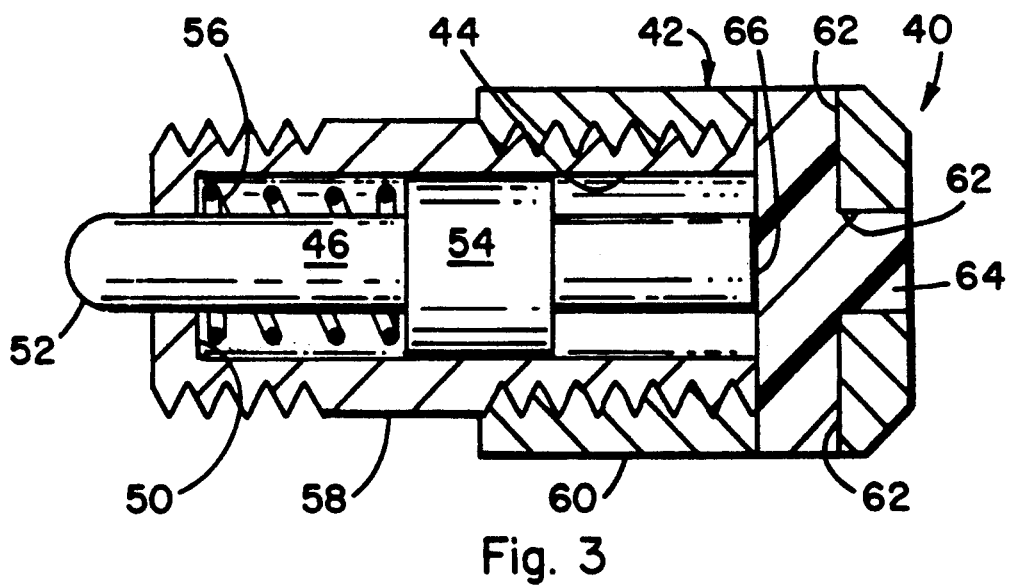
FIG. 3 is an enlarged elevational view in cross-section of the locking pin assembly.
Figure 4:
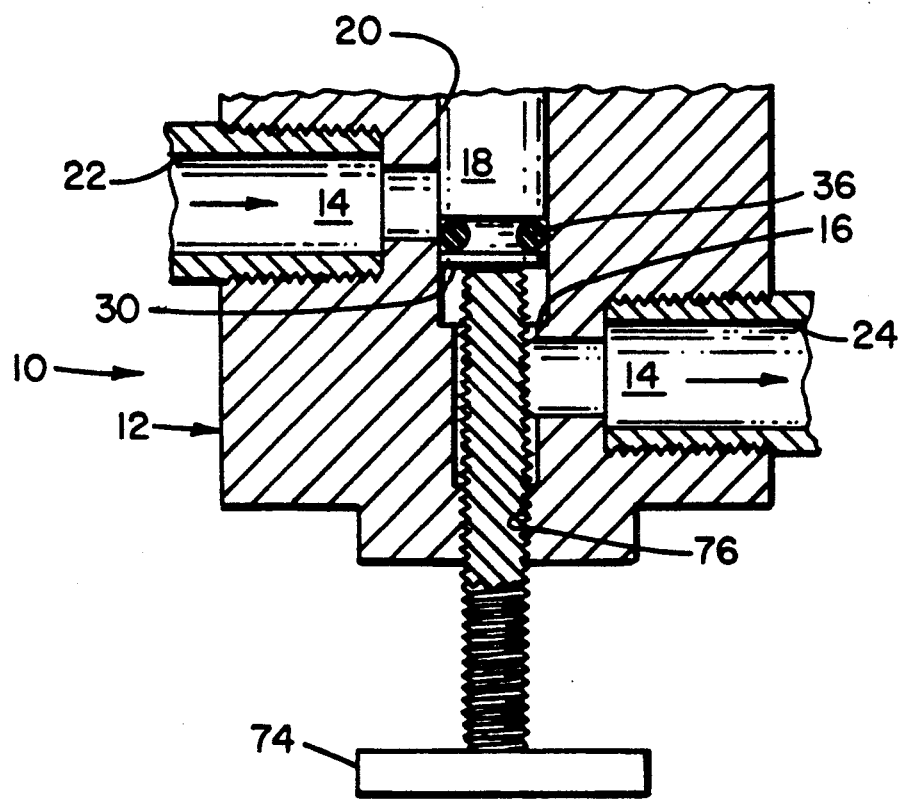
FIG. 4 is a fractional view in cross-section of FIG. 2 showing the loading tool engaging the end surface of the valve member for the purpose of moving the valve member to the open position.

The inner end of the second cylindrical chamber of the housing 42 defines an annular seat 50 (see FIG. 3). The inner end 52 of the locking pin is rounded to engage within the abutment or annular groove 48 in the valve member 18 to lock the valve member in the open position shown in FIG. 1.

The locking pin 46 defines along a part of its length a coaxial circular abutment 54, which has a greater diameter than the general diameter of the locking pin. A second spring arrangement 56 is provided in the locking pin assembly 40 and it extends around one end of the locking pin and in compression between the annular seat 50 of the housing and the coaxial circular abutment on the locking pin for biasing the locking pin away from the valve member 18.

The housing 42 for the locking pin assembly 40 comprises a cylindrical retainer sleeve 58 and a cylindrical sensor body 60, the latter having a greater diameter than the cylindrical retainer sleeve. The cylindrical retainer sleeve is threaded externally along its length for threaded engagement of its inner end portion into and through the opening 38 in the side wall of the valve body, and also its outer end portion is in threaded engagement with the internal threaded portion of the cylindrical sensor body.

The cylindrical sensor body 60 of the housing for the locking pin assembly defines at least one escape port 62, preferably at least two such escape ports, and most preferably three such escape ports, through the wall of the cylindrical sensor body. One escape port is located axially opposite the outer end of the locking pin 46, and the other two escape ports are located diametrically opposite each other. A heat-meltable material 64, such as a metallic alloy, is melted and poured into the housing, filling the escape ports and extending into the second cylindrical chamber 44. When the metallic alloy cools, it becomes an unmelted plug serving to engage in abutment against the opposite or outer end of the locking pin. The unmelted plug thus causes the locking pin to be retained in an extended position against the bias of the second spring arrangement 56 and to be locked within the abutment 48 in the side surface of the valve member 18. The valve member is, therefore, held in the open position shown in FIG. 1.

The outer end of the locking pin 46 opposite from its rounded end portion 52 is in the form of a flat end surface 66, which has a smaller diameter than the interior wall surface of the second cylindrical chamber 44, for engagement against the unmelted plug of heat-meltable material 64.

The cylindrical retainer sleeve 58 of the housing 42 for the locking pin assembly defines a smooth interior wall surface for the second cylindrical chamber 44. The outer surface of the coaxial circular abutment 54 of the locking pin 46 slidingly engages with the smooth interior wall surface in the cylindrical retainer sleeve and guides the locking pin for sliding movement within the second cylindrical chamber 44.

OPERATION

When undesirable conditions occur resulting in a fire or undue increased heat in the ambient atmosphere about the installed fire control valve 10 through which flammable material is flowing, the heat-meltable material 64, which is exposed to such atmosphere through the escape ports, is caused to melt. The former solid plug of unmelted material is, therefore, converted by the heat to liquid, and the former plug no longer exists as such to abut against the outer end of the locking pin 46 of the locking pin assembly 40. The compressed second spring arrangement 56 thus becomes enabled to operate, immediately forcing the locking pin 46 in retraction from the abutment 48 in the valve member 18. The smaller diametered flat end surface 66 at one end of the locking pin exerts a greater force due to its smaller surface area in relation to the surface area of melting material to push against the melting material, thereby rapidly forcing the melting material out through the escape ports 62 as the locking pin is caused to retract from the valve member. The coaxial circular abutment 54 on the locking pin, upon being moved into contact with any melting fusible material remaining in the second cylindrical chamber 44, causes the remainder to be expelled through the escape ports.

Figure 2:
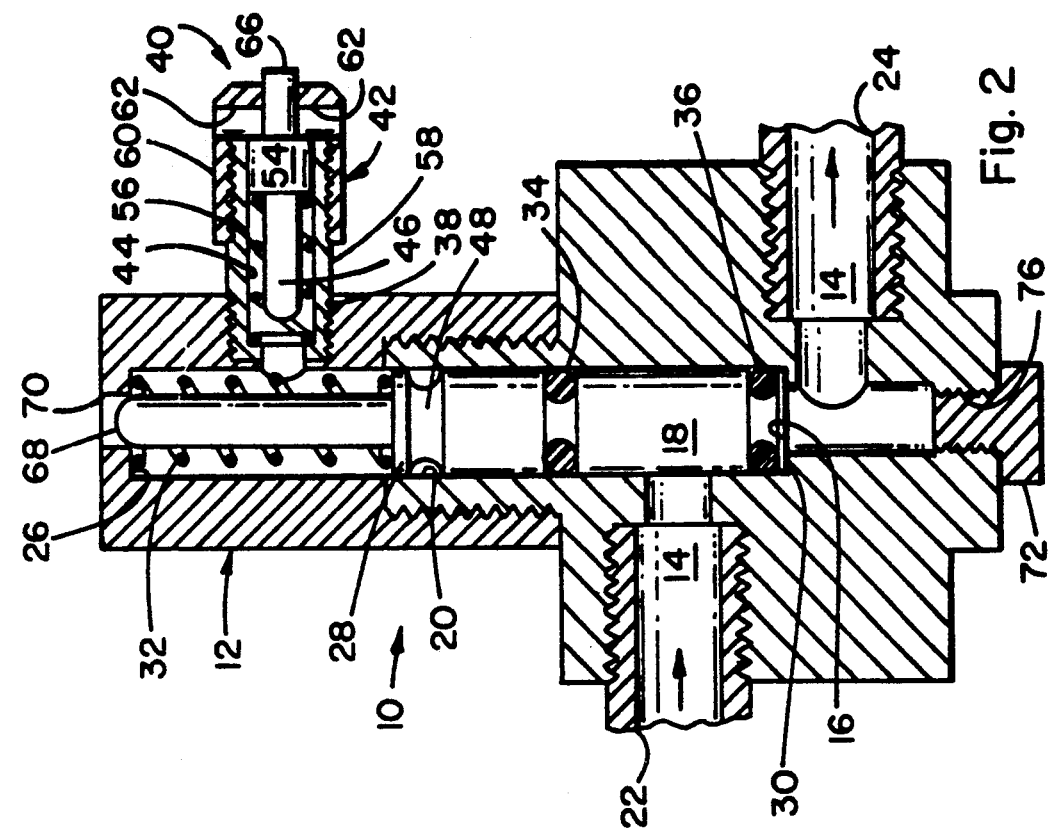
FIG. 2 is a view similar to FIG. 1 except that the heat-meltable material in the locking pin assembly has become melted and expelled from the locking pin assembly, and the locking pin of the locking pin assembly has retracted from the valve member, thereby enabling the valve member to close into a seated position against the valve seat.

Upon the locking pin 46 becoming freed from its engagement with the abutment 48 in the side surface of the valve member, the bias of the compressed first spring arrangement 32 becomes effective to force the valve member 18 to move rapidly into seated position against the valve seat 16. The flow of flammable material through the fire control valve is thus interrupted. The seated position of the valve member 18 against the valve seat is shown in FIG. 2. In the closed position of the valve member, the first O-ring seal 34 prevents any further flow of flammable material through the inlet 22 into the flow passage 14 and past the first O-ring seal 34 to atmosphere. The second O-ring seal 36 prevents any possible back flow of flammable material from the outlet 24 of the flow passage 14 and past the second O-ring seal 36 and the valve seat to atmosphere.

When the conditions causing the fire or undue increased heat have been corrected, the fire control valve can then be reset to perform its normal function. The former locking pin assembly 40 is readily removed and replaced by a previously prepared locking pin assembly 40 in which the heat-meltable material is in place in the locking pin assembly in the form of an unmelted plug. The unmelted plug is thus in abutment against the outer end of the locking pin 46 to hold it in its extended position in engagement with the abutment on the side surface of the valve member 18. The valve member 18 has been returned to the open position to resume the flow of the flammable material through the fire control valve.

Another object of my invention is to provide a visible signal that the flow of flammable material through the fire control valve 10 has been interrupted. The outer end portion 68 of the valve member 18 is designed to extend through and beyond an opening 70 in and through the end wall 26 in the first cylindrical chamber 20, as shown in FIG. 1. When the valve member 18 is caused to move to the closed position, the outer end portion 68 disappears from sight into and within the valve body 12, as shown in FIG. 2. This disappearance is a visible indication that some undesirable condition has occurred causing an interruption in the flow of flammable material.

In order to reset the valve member 18 to the open position, a threaded plug 72, which is located at one end of the valve body 12, is removed and a loading tool 74 is inserted in its place. The loading tool is threaded along its length to match the threads of the bore 76 for the threaded plug 72. As the loading tool is rotated, it is advanced into engagement with the end surface 30 of the valve member 18, and continued rotation of the tool forces the valve member to retract from the closed position shown in FIG. 2 to the open position shown in FIG. 1. The locking pin 46 of the locking pin assembly is then re-engaged with the abutment 48 in the valve member 18 to re-lock the valve member in the open position. The loading tool is reversely rotated to remove it from the threaded bore 76 in the valve body 12, and the threaded plug 72 is replaced in the threaded bore to seal the one end of the first cylindrical chamber 20.

It will be noted, therefore, from the preceding discussion and from the drawings that the locking pin assembly 40 is readily accessible from the exterior of the fire control valve 10 so that it can be easily removed and replaced without disassembly of the fire control valve. It should also be noted that the arrangement of the fire control valve is such that it is doubly sealed against leakage of the flammable material to atmosphere in either the open or closed positions of the valve member.

The invention has been described in detail with particular reference to preferred embodiments thereof, but it will be understood that variations and modifications can be effected within the spirit and scope of the invention.

I claim:

1. A fire control valve comprising a valve body defining a flow passage therethrough and adapted to be connected to a flow line through which flammable material flows;

said valve body including a valve seat and defining a first cylindrical chamber extending along a part of the length of said valve body;

a valve member movably mounted within said first cylindrical chamber and engageable into a seated position with said valve seat and forming a closure for the flow passage when engaged with said valve seat and defining within and around its side surface an annular groove, said valve member being generally cylindrical and sized for a sliding fit with the walls of said first cylindrical chamber and having sealing means extending around said valve member and between said valve member and the walls of said first cylindrical chamber, said annular groove being spaced at the opposite end of said valve member from said valve seat and adjacent said sealing means, said sealing means being located between said annular groove and said valve seat;

a first spring means biasing said valve member into engagement with said valve seat;

a locking pin assembly for releasably retaining the valve member in a retracted position from said valve seat to enable flow of said flammable material through said flow passage, said locking pin assembly having (a) a locking pin movably mounted to engage within said annular groove on said valve member when the valve member is in said retracted position, (b) a temperature-responsive means including heat-meltable material as an unmelted plug engaging against the opposite end of said locking pin and retaining said locking pin in engagement within said annular groove, and (c) a second spring means biasing said locking pin away from engagement within said annular groove;

said valve body having an end wall at the opposite end of said first cylindrical chamber from said valve seat, said end wall defining an opening through the exterior of said valve body and being spaced above and disposed adjacent said annular groove, said valve body also defining: an inlet to said flow passage through which said flammable material enters into said valve body and an outlet to said flow passage through which said flammable material exits from said valve body, and an opening through a side wall of said valve body into said first cylindrical chamber and wherein said locking pin assembly extends into said side wall opening at a location between said sealing means on said valve member and said end wall of said first cylindrical chamber; and said valve member also having an outer end portion that extends visibly through said end wall opening outside said exterior of said valve body when said valve member is in the retracted position from said valve seat, said valve member in said retracted position being out of the path of flow of said flammable material through said flow passage.

2. A fire control valve as defined in claim 1, and wherein said valve member has at one end a flange facing opposite said end wall of said first cylindrical chamber and has at the other end an end surface conformed to engage against said valve seat when in said seated position, said first spring means extends around the valve member adjacent said flange of said valve member and in compression between said flange and said end wall of said first cylindrical chamber; and said sealing means for said valve member includes first and second seals spaced from each other along the length of said valve member and extending around said valve member and between said valve member and said walls of said first cylindrical chamber.

3. A fire control valve as defined in claim 1, and wherein said locking pin assembly includes a housing having an inner end extending at an angle into and through said side wall of said fire control valve, said housing defining within a second cylindrical chamber extending the length of said housing and said locking pin being movably mounted within said second cylindrical chamber, the inner end of said second cylindrical chamber defining an annular seat, said locking pin defining along a part of its length a coaxial circular abutment having a greater diameter than the general diameter of said locking pin, and said second spring means for said locking pin assembly extending around one end of said locking pin and in compression between said annular seat and said coaxial circular abutment.

4. A fire control valve as defined in claim 3, and wherein the outer end of said housing of said locking pin assembly defines at least one escape port through the wall of said housing and said heat-meltable material fills said at least one escape port and extends into said second cylindrical chamber to form an unmelted plug engaging against the opposite end of said locking pin and retaining said locking pin in engagement with the abutment on the side surface of said valve member.

5. A fire control valve as defined in claim 3, and wherein the outer end of said housing of said locking pin assembly defines at least two escape ports through the wall of said housing and being located diametrically opposite each other, and said heat-meltable material fills said at least two escape ports and extends into said second cylindrical chamber to form an unmelted plug engaging the opposite end of said locking pin and retaining said locking pin in engagement with the abutment on the side surface of said valve member.

6. A fire control valve as defined in claim 3, and wherein the outer end of said housing of said locking pin assembly defines at least three escape ports through the wall of said housing, two of said escape ports being located diametrically opposite each other and the third escape port being located axially opposite the outer end of said locking pin, and said heat-meltable material fills said three escape ports and extends into said second cylindrical chamber to form an unmelted plug engaging the opposite end of said locking pin and retaining said locking pin in engagement with the abutment on the side surface of said valve member.

7. A fire control valve as defined in claim 3, and wherein said housing for said locking pin assembly comprises a cylindrical retainer sleeve and a cylindrical sensor body, said cylindrical sensor body having a greater diameter than said cylindrical retainer sleeve, said cylindrical retainer sleeve being externally threaded along its length for threaded engagement of its inner end portion into and through said side wall of said valve body and also for threaded engagement of its outer end portion into said cylindrical sensor body, said sensor body being internally threaded along an inner portion of its length for receiving in threaded engagement said outer end portion of said cylindrical retainer sleeve.

8. A fire control valve as defined in claim 7, and wherein said cylindrical sensor body of the housing for said locking pin assembly defines at least one escape port through the wall of said cylindrical sensor body and said heat-meltable material fills said at least one escape port and extends into said second cylindrical chamber to form an unmelted plug engaging against the opposite end of said locking pin and retaining said locking pin in engagement with the abutment on the side surface of said valve member.

9. A fire control valve as defined in claim 7, and wherein said cylindrical sensor body of the housing for said locking pin assembly defines at least two escape ports through the wall of said cylindrical sensor body and being located diametrically opposite each other, and said heat-meltable material fills said at least two escape ports and extends into said second cylindrical chamber to form an unmelted plug engaging against the opposite end of said locking pin and retaining said locking pin in engagement with the abutment on the side surface of said valve member.

10. A fire control valve as defined in claim 7, and wherein said cylindrical sensor body of the housing for said locking pin assembly defines at least three escape ports through the wall of said sensor body, two of said escape ports being located diametrically opposite each other and the third escape port being located axially opposite the outer end of said locking pin, and said heat-meltable material fills said three escape ports and extends into said second cylindrical chamber to form an unmelted plug engaging the opposite end of said locking pin and retaining said locking pin in engagement with the abutment on the side surface of said valve member.

11. A fire control valve as defined in claim 10, and wherein said opposite end of said locking pin has a smaller diameter than said third escape port for enabling said opposite end of the locking pin to slidingly fit within said third escape port when said plug melts.

12. A fire control valve as defined in claim 1, and wherein said locking pin assembly is removably connected to said fire control valve.

13. A fire control valve as defined in claim 1, and wherein said one end of said locking pin assembly is threadedly seated within said opening through the side wall of said valve body.

14. A fire control valve as defined in claim 3 and wherein said housing includes a cylindrical retainer sleeve defining a smooth interior wall surface for said second cylindrical chamber and the outer surface of the coaxial circular abutment of said locking pin slidingly engages with said smooth interior wall surface in said cylindrical retainer sleeve and guides said locking pin for sliding movement within said second cylindrical chamber.

15. A fire control valve as defined in claim 3, and wherein said locking pin defines at one end a rounded end portion for engagement with the abutment on said side surface of said valve member and at its opposite end a flat end surface having a smaller diameter than the interior wall surface of said second cylindrical chamber for engagement against said unmelted plug.

* * * * *